TEST

United States Patent
Yabuuchi et al.

(12) United States Patent
(10) Patent No.: US 11,222,439 B2
(45) Date of Patent: Jan. 11, 2022

(54) IMAGE PROCESSING APPARATUS WITH LEARNERS FOR DETECTING ORIENTATION AND POSITION OF FEATURE POINTS OF A FACIAL IMAGE

(71) Applicant: OMRON Corporation, Kyoto (JP)

(72) Inventors: Tomohiro Yabuuchi, Kyoto (JP); Koichi Kinoshita, Kyoto (JP); Tomoyoshi Aizawa, Kyoto (JP); Tadashi Hyuga, Hirakata (JP); Hatsumi Aoi, Kyotanabe (JP); Mei Uetani, Uji (JP)

(73) Assignee: OMRON Corporation, Kyoto (JP)

( * ) Notice: Subject to any disclaimer, the term of this patent is extended or adjusted under 35 U.S.C. 154(b) by 111 days.

(21) Appl. No.: 16/544,968

(22) Filed: Aug. 20, 2019

(65) Prior Publication Data
US 2019/0370996 A1    Dec. 5, 2019

Related U.S. Application Data

(63) Continuation of application No. PCT/JP2017/036279, filed on Oct. 5, 2017.

(51) Int. Cl.
*G06K 9/00* (2006.01)
*G06T 7/73* (2017.01)

(52) U.S. Cl.
CPC ............ *G06T 7/73* (2017.01); *G06K 9/00228* (2013.01); *G06T 2207/20081* (2013.01); *G06T 2207/20084* (2013.01); *G06T 2207/30201* (2013.01)

(58) Field of Classification Search
CPC ............ G06T 7/73; G06T 2207/20081; G06T 2207/20084; G06T 2207/30201; G06K 9/00228; G06K 9/00281
See application file for complete search history.

(56) References Cited

U.S. PATENT DOCUMENTS 7,742,623 B1 * 6/2010 Moon ................. G06K 9/00228
                                                      382/103
9,020,209 B2 * 4/2015 Minato .............. G06K 9/00281
                                                      382/118
(Continued)

FOREIGN PATENT DOCUMENTS

JP      2005-056231 A      3/2005
JP      2007-066010 A      3/2007
(Continued)

OTHER PUBLICATIONS

Favelle et al., "The face inversion effect following pitch and yaw rotations: investigating the boundaries of holistic processing", frontiers in psychology, Dec. 2012 (Year: 2012).*
(Continued)

*Primary Examiner* — Randolph I Chu
(74) *Attorney, Agent, or Firm* — Metrolex IP Law Group, PLLC

(57) ABSTRACT

An image processing apparatus includes a first learner trained to detect an orientation of a face in an image including a human face for receiving an input of a target image including a human face and outputting first information associated with an orientation of a face included in the target image, at least one second learner trained, for the first information, to detect a position of a facial component in an image including a human face for receiving an input of the target image and outputting second information associated with a position of a facial component included in the target image, and a control unit that controls the first learner and the second learner. The control unit uses the first learner to obtain the first information from the target image, and uses the second learner corresponding to the first information to obtain the second information from the target image.

19 Claims, 13 Drawing Sheets

(56) References Cited

U.S. PATENT DOCUMENTS

| | | | |
|---|---|---|---|
| 9,239,617 B2* | 1/2016 | Son | G06K 9/00255 |
| 9,846,807 B1* | 12/2017 | Mayer | G06K 9/66 |
| 2007/0047822 A1* | 3/2007 | Kitamura | G06K 9/6256 |
| | | | 382/224 |
| 2007/0104374 A1 | 5/2007 | Terakawa | |
| 2007/0217683 A1 | 9/2007 | Kinoshita | |
| 2008/0130961 A1 | 6/2008 | Kinoshita | |
| 2010/0054592 A1* | 3/2010 | Nanu | H04N 5/23219 |
| | | | 382/167 |
| 2010/0183218 A1* | 7/2010 | Naito | G06K 9/00281 |
| | | | 382/159 |
| 2011/0158540 A1* | 6/2011 | Suzuki | G06K 9/00288 |
| | | | 382/195 |
| 2012/0189160 A1 | 7/2012 | Kaneda et al. | |
| 2013/0243274 A1* | 9/2013 | Sukegawa | G06K 9/00221 |
| | | | 382/118 |
| 2014/0121927 A1* | 5/2014 | Hanita | B60T 7/14 |
| | | | 701/70 |
| 2015/0055085 A1* | 2/2015 | Fonte | H04N 5/23219 |
| | | | 351/178 |
| 2015/0146991 A1* | 5/2015 | Nakano | G06K 9/00288 |
| | | | 382/219 |
| 2015/0243031 A1* | 8/2015 | Narasimha | G06K 9/6256 |
| | | | 382/103 |
| 2015/0278584 A1* | 10/2015 | Nakano | G06K 9/00288 |
| | | | 382/118 |
| 2015/0279113 A1* | 10/2015 | Knorr | G06T 15/50 |
| | | | 345/633 |
| 2015/0310261 A1* | 10/2015 | Lee | G06K 9/00221 |
| | | | 382/203 |
| 2016/0267339 A1* | 9/2016 | Nakano | G06K 9/00228 |
| 2016/0307324 A1* | 10/2016 | Nakada | G06K 9/6215 |
| 2017/0154207 A1* | 6/2017 | Sasaki | G06K 9/4652 |
| 2017/0345183 A1* | 11/2017 | Chen | G06T 7/55 |
| 2018/0158230 A1* | 6/2018 | Yan | G06T 11/00 |
| 2018/0239975 A1* | 8/2018 | Tamrakar | G06K 9/00261 |
| 2019/0026540 A1* | 1/2019 | Tahara | G06K 9/00281 |
| 2019/0035149 A1* | 1/2019 | Chen | G06T 7/50 |
| 2020/0257893 A1* | 8/2020 | Trani | G06K 9/00288 |

FOREIGN PATENT DOCUMENTS

| | | |
|---|---|---|
| JP | 2007-108990 A | 4/2007 |
| JP | 2007-249280 A | 9/2007 |
| JP | 2012-037934 A | 2/2012 |
| JP | 2016-197371 A | 11/2016 |
| WO | 2006/051607 A1 | 5/2006 |

OTHER PUBLICATIONS

English translation of the International Search Report ("ISR") of PCT/JP2017/036279 dated Jan. 9, 2018.

Written Opinion ("WO") of PCT/JP2017/036279 dated Jan. 9, 2018.

* cited by examiner

Mask

IMAGE PROCESSING APPARATUS WITH LEARNERS FOR DETECTING ORIENTATION AND POSITION OF FEATURE POINTS OF A FACIAL IMAGE

CROSS REFERENCE TO RELATED APPLICATIONS

This application is a continuation application of International Application No. PCT/JP2017/036279, filed on Oct. 5, 2017, which claims priority based on the Article 8 of Patent Cooperation Treaty from prior Japanese Patent Application No. 2017-048535, filed on Mar. 14, 2017, the entire contents of which are incorporated herein by reference.

FIELD

The present disclosure relates to an image processing apparatus, an image processing method, and an image processing program.

BACKGROUND

Various techniques have been developed to detect the orientation of a face or the positions of facial components from an image including a human face. For example, image processing apparatuses that detect feature points using three-dimensional models are described in Patent Literature 1 and Patent Literature 2.

CITATION LIST

Patent Literature

Patent Literature 1: WO 2006/051607
Patent Literature 2: Japanese Unexamined Patent Application Publication No. 2007-249280

SUMMARY

Technical Problem

However, for a target person in an image wearing a mask or sunglasses, the face is mostly covered, and a sufficient number of nodes cannot be detected. In this case, the positions of facial components cannot be estimated. In response to this issue, one or more aspects are directed to an image processing apparatus, an image processing method, and an image processing program that can detect at least the positions of facial components from an image including a face partially covered by, for example, a mask.

Solution to Problem

An image processing apparatus according to one or more aspects includes a first learner trained to detect an orientation of a face in an image including a human face for receiving an input of a target image including a human face and outputting first information associated with an orientation of a face included in the target image, at least one second learner trained, for the first information, to detect a position of a facial component in an image including a human face for receiving an input of the target image and outputting second information associated with a position of a facial component included in the target image, and a control unit that controls the first learner and the second learner. The control unit uses the first learner to obtain the first information from the target image, and uses the second learner corresponding to the first information to obtain the second information from the target image.

In this structure, the learner corresponding to the first information output from the first learner is used as the second learner to detect the position of a facial component in a target image. In other words, a facial component is detected with each learner trained with a specific orientation of the face. This structure can detect the position of a facial component with increased accuracy.

In the image processing apparatus, the first information may include a piece of information selected from a plurality of different pieces of orientation information each defining an orientation of a human face.

In the image processing apparatus described above, the second information may include information indicating a position of at least one feature point defined in a facial component of a human face.

The image processing apparatus described above may further include at least one third learner trained, for the first information, to detect an orientation of a face in an image including a human face. The third learner receives an input of the target image and outputs third information associated with the orientation of the face included in the target image. The control unit may use the third learner corresponding to the first information output from the first learner to obtain the third information from the target image.

In this structure, the learner corresponding to the first information output from the first learner is used as the third learner to detect the face orientation in the target image. In other words, a face orientation is detected with each learner trained with a specific orientation of the face. This structure can detect the orientation with increased accuracy.

In the image processing apparatus described above, the third information may include information indicating an angle representing an orientation of a human face.

The image processing apparatus described above may further include at least one fourth learner trained, for the first information, to detect a position of a facial component in an image including a human face. The fourth learner receives an input of the target image including a facial component associated with the second information and outputs fourth information associated with the position of the facial component included in the target image. The control unit may use the fourth learner corresponding to the first information output from the first learner to obtain the fourth information from the target image including the facial component associated with the second information.

In this structure, the fourth learner used to detect the position of a facial component is trained using the target image including the facial component associated with the second information, instead of using the entire target image. This structure more locally detects the position of the facial component. This structure can detect a facial component with increased accuracy.

In the image processing apparatus described above, the second information may include information indicating a position of at least one feature point defined in a facial component of a human face, and the fourth learner may be defined based on the target image as the input into the second learner, receive an input of an image including the feature point, and output a position of the at least one feature point.

The image processing apparatus described above may further include a cover determination unit that determines whether the target image includes a cover partially covering a face. The control unit may control the first learner and the second learner to receive an input of the target image and output the first information and the second information when the cover determination unit determines that the target image includes the cover.

In the image processing apparatus described above, each learner may be constructed using a neural network.

An image processing method according to one or more aspects includes preparing a first learner trained to detect an orientation of a face in an image including a human face, obtaining, with the first learner, first information associated with an orientation of a human face from a target image including a human face, preparing at least one second learner trained, for the first information, to detect a position of a facial component in an image including a human face, and outputting, with the second learner corresponding to the first information output from the first learner, second information associated with a position of a facial component obtained from the target image. The steps described above may be performed in any order as appropriate. For example, the second learner may be prepared before the first information is obtained. The same applies to third and fourth learners described below.

The image processing method may further include determining whether the target image includes a cover partially covering a face. When the target image includes the cover, the first learner is prepared, the first information is output, the second learner is prepared, and the second information is output.

The image processing method described above may further include preparing at least one third learner trained, for the first information, to detect an orientation of a face in an image including a human face, and outputting, with the third learner corresponding to the first information output from the first learner, third information associated with the orientation of the face obtained from the target image.

The image processing method described above may further include preparing at least one fourth learner trained, for the first information, to detect a position of a facial component in an image including a human face, and outputting, with the fourth learner corresponding to the first information output from the first learner, fourth information associated with the position of the facial component obtained from the target image including the facial component associated with the second information.

With the image processing method described above, each learner may be constructed using a neural network.

An image processing program according to one or more aspects causes a computer to implement preparing a first learner trained to detect an orientation of a face in an image including a human face, obtaining, with the first learner, first information associated with an orientation of a human face from a target image including a human face, preparing at least one second learner trained, for the first information, to detect a position of a facial component in an image including a human face, and outputting, with the second learner corresponding to the first information output from the first learner, second information associated with a position of a facial component obtained from the target image. The steps described above may be performed in any order as appropriate. For example, the second learner may be prepared before the first information is obtained. The same applies to third and fourth learners described below.

The image processing program may further cause the computer to implement determining whether the target image includes a cover partially covering the face. When the target image includes the cover, the first learner is prepared, the first information is output, the second learner is prepared, and the second information is output.

The image processing program may further cause the computer to implement preparing at least one third learner trained, for the first information, to detect an orientation of a face in an image including a human face, and outputting, with the third learner corresponding to the first information output from the first learner, third information associated with the orientation of the face obtained from the target image.

The image processing program described above may further cause the computer to implement preparing at least one fourth learner trained, for the first information, to detect a position of a facial component in an image including a human face, and outputting, with the fourth learner corresponding to the first information output from the first learner, fourth information associated with the position of the facial component obtained from the target image including the facial component associated with the second information.

In the image processing program described above, each learner may be constructed using a neural network.

Advantageous Effects

The apparatus, method, and program according to one or more aspects can detect at least the positions of facial components from an image including a face partially covered by, for example, a mask.

DETAILED DESCRIPTION

An image processing apparatus, an image processing method, and an image processing program according to an embodiment or one or more embodiments will now be described with reference to the drawings. Embodiments described below are mere examples of the present invention in any aspect, and may be variously modified or altered without departing from the scope of the present invention. More specifically, any configuration specific to an embodiment may be used as appropriate to implement one or more embodiments. Although data used in one or more embodiments is described in a natural language, such data may be specifically defined using any computer-readable language, such as a pseudo language, commands, parameters, or a machine language.

1. Overview of Image Processing System

Figure 1:
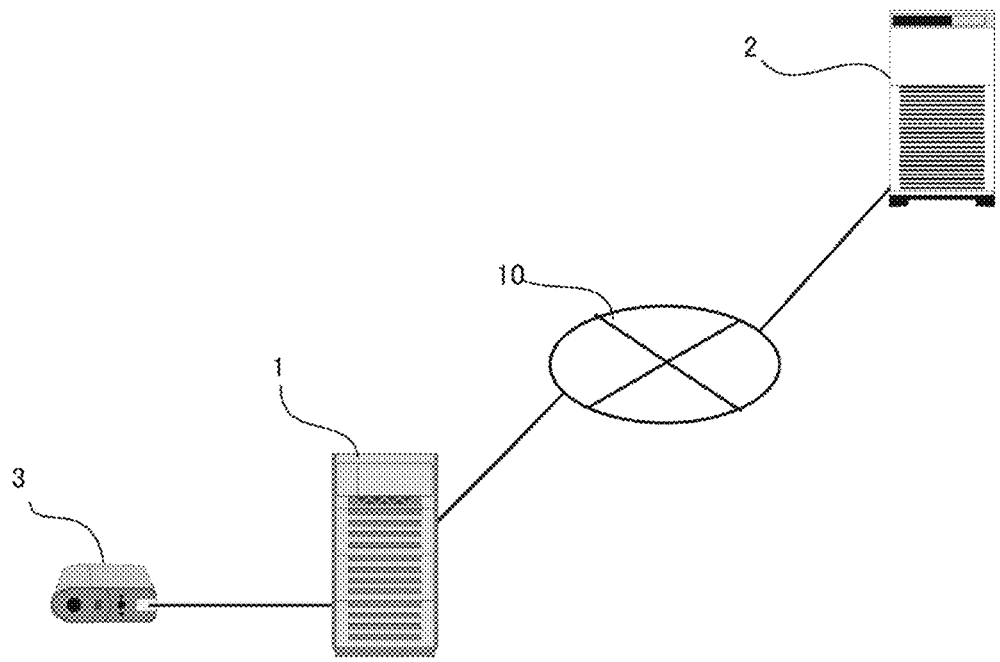
FIG. 1 is a schematic diagram illustrating an image processing system including an image processing apparatus according to one or more embodiments.

An image processing system including the image processing apparatus according to one or more embodiments will now be described with reference to FIG. 1. The image processing system includes an image processing apparatus 1, a learning apparatus 2, and a camera 3. In the image processing system, the image processing apparatus 1 captures an image including a person (target image) with the camera 3, and detects the orientation of a human face and the positions of facial components, such as the eyes, nose, and mouth, based on the image. The image processing apparatus 1 according to one or more embodiments can detect the orientation of a human face or other information effectively although the face is covered by, for example, a mask or sunglasses in a captured image.

Figure 4:
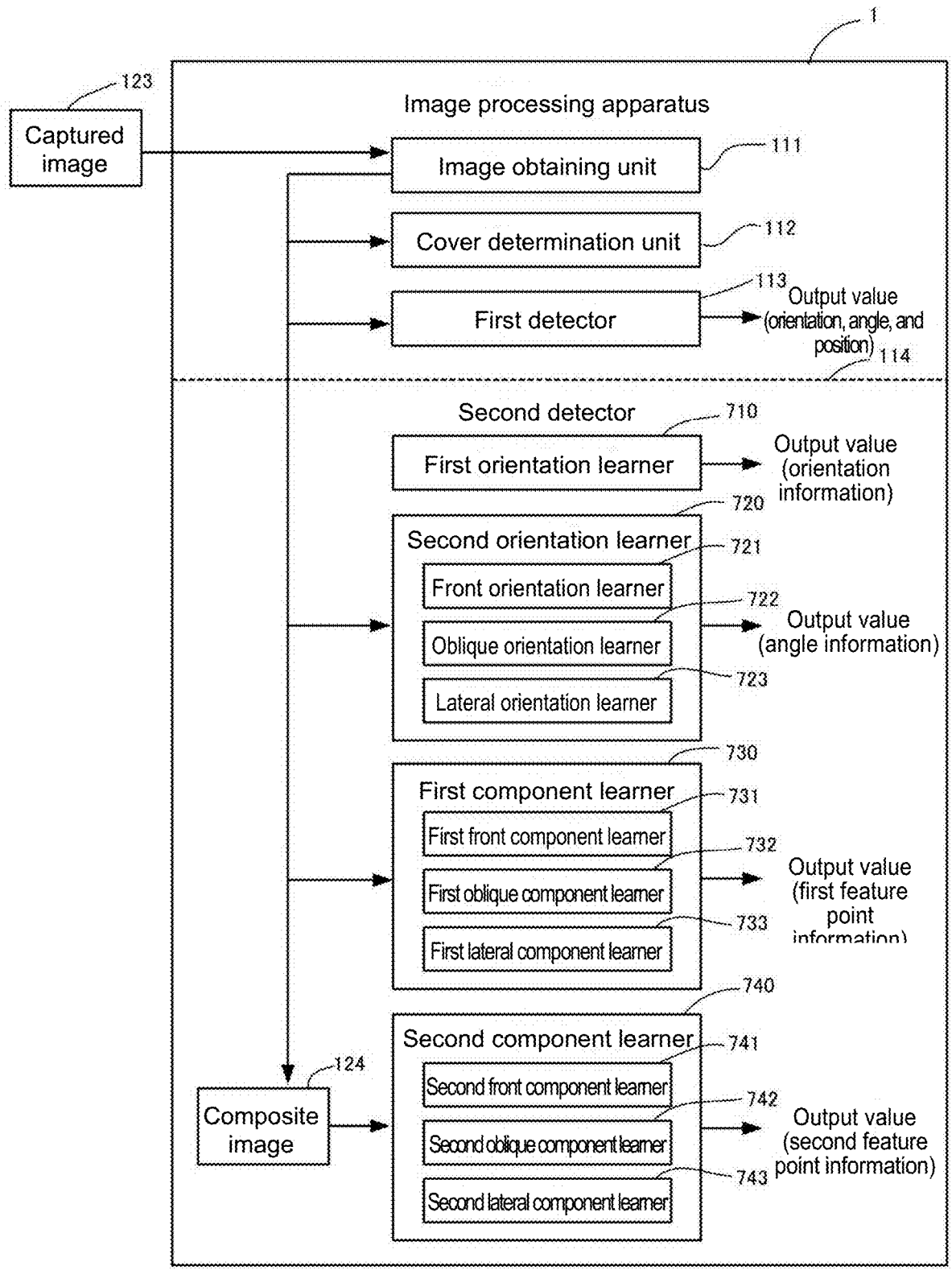
FIG. 4 is a functional block diagram illustrating an image processing apparatus, such as in FIG. 1.

More specifically, as shown in FIG. 4 (described later), the image processing apparatus 1 includes a first detector 113, which detects, for example, the orientation of a face with no cover, and a second detector 114, which detects, for example, the orientation of a face with a cover. The second detector 114 detects the orientation of a face or other information through learners constructed using neural networks. Thus, the learning apparatus 2 trains the learners included in the second detector 114.

For example, the image processing apparatus 1 can obtain learners trained by the learning apparatus 2 through a network 10. The network 10 may be selected as appropriate from, for example, the Internet, a wireless communication network, a mobile communication network, a telephone network, and a dedicated network. The image processing apparatus 1 may be connected directly to the learning apparatus 2 to transfer learners. Instead of connecting the image processing apparatus 1 to the learning apparatus 2, the learners trained by the learning apparatus 2 may be stored into a storage medium such as a compact disc read-only memory (CD-ROM), and may be read into the image processing apparatus 1. The apparatuses will now be described in detail.

1-1. Camera

The camera 3 may be a known camera. The camera 3 captures an image of a person to generate a captured image, and outputs the captured image to the image processing apparatus 1. A captured image may be a still image or a moving image. For a moving image, a face orientation or other information may be detected on a frame-by-frame basis by the image processing apparatus 1.

1-2. Image Processing Apparatus

Figure 2:
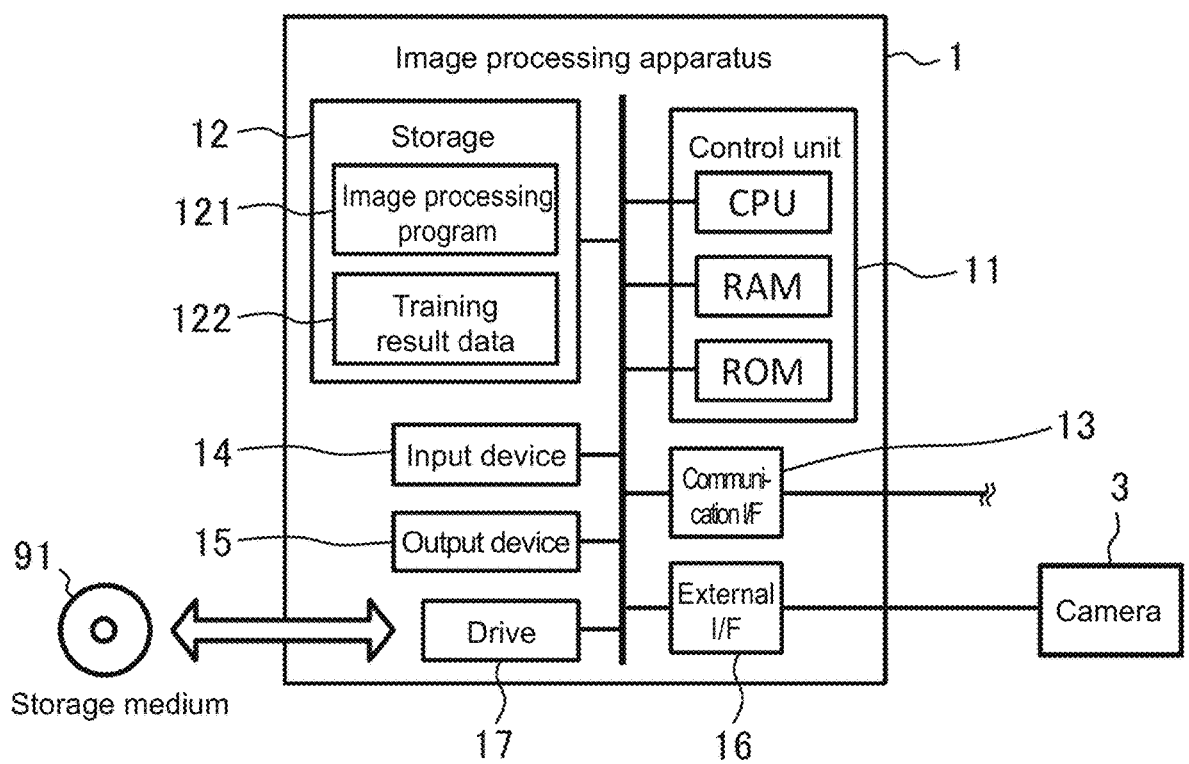
FIG. 2 is a block diagram illustrating a hardware configuration of an image processing apparatus, such as in FIG. 1.

FIG. 2 is a block diagram of the image processing apparatus according to one or more embodiments. As shown in FIG. 2, the image processing apparatus 1 according to one or more embodiments is a computer including a control unit 11, a storage 12, a communication interface 13, an input device 14, an output device 15, an external interface 16, and a drive 17 that are electrically connected to one another. In FIG. 1, the communication interface and the external interface are abbreviated as a communication I/F and an external I/F.

The control unit 11 includes, for example, a central processing unit (CPU), a random access memory (RAM), and a read only memory (ROM). The control unit 11 controls each unit in accordance with intended information processing. The storage 12 is an auxiliary storage device such as a hard disk drive or a solid state drive. The storage 12 stores, for example, an image processing program 121 to be executed by the control unit 11 and training result data 122 indicating information about trained learners.

The image processing program 121 is executed by the image processing apparatus 1 to determine whether a face in a captured image is covered. To detect the orientation of a face and the positions of facial components, the first detector 113 is used when the face is not covered, and the second detector 114 is used when the face is covered. The training result data 122 is used to set the trained learners. This will be described in detail later.

The communication interface 13 is an interface for wired or wireless communication through a network, and may be a wired local area network (LAN) module or a wireless LAN module. The input device 14 is, for example, a mouse or a key board. The output device 15 is, for example, a display or a speaker. The external interface 16 is an interface such as a universal serial bus (USB) port for connection to external devices, such as the camera 3.

The drive 17 includes, for example, a compact disc (CD) drive or a digital versatile disc (DVD) drive for reading a program stored in a storage medium 91. The type of drive 17 may be selected as appropriate depending on the type of storage medium 91. The image processing program 121 and/or the training result data 122 may be stored in the storage medium 91.

The storage medium 91 stores programs or other information in an electrical, magnetic, optical, mechanical, or chemical manner to allow a computer or another device or machine to read the recorded programs or other information. The image processing apparatus 1 may obtain the image processing program 121 and/or the training result data 122 from the storage medium 91.

In FIG. 2, the storage medium 91 is a disc-type storage medium, such as a CD or a DVD. However, the storage medium 91 is not limited to a disc. One example of the storage medium other than a disc is a semiconductor memory such as a flash memory.

For the specific hardware configuration of the image processing apparatus 1, components may be eliminated, substituted, or added as appropriate depending on an embodiment. For example, the control unit 11 may include multiple processors. The image processing apparatus 1 may include multiple information processing apparatuses. The image processing apparatus 1 may also be an information processing apparatus dedicated to an intended service, or may be a general-purpose desktop personal computer (PC) or a tablet PC.

1-3. Learning Apparatus

Figure 3:
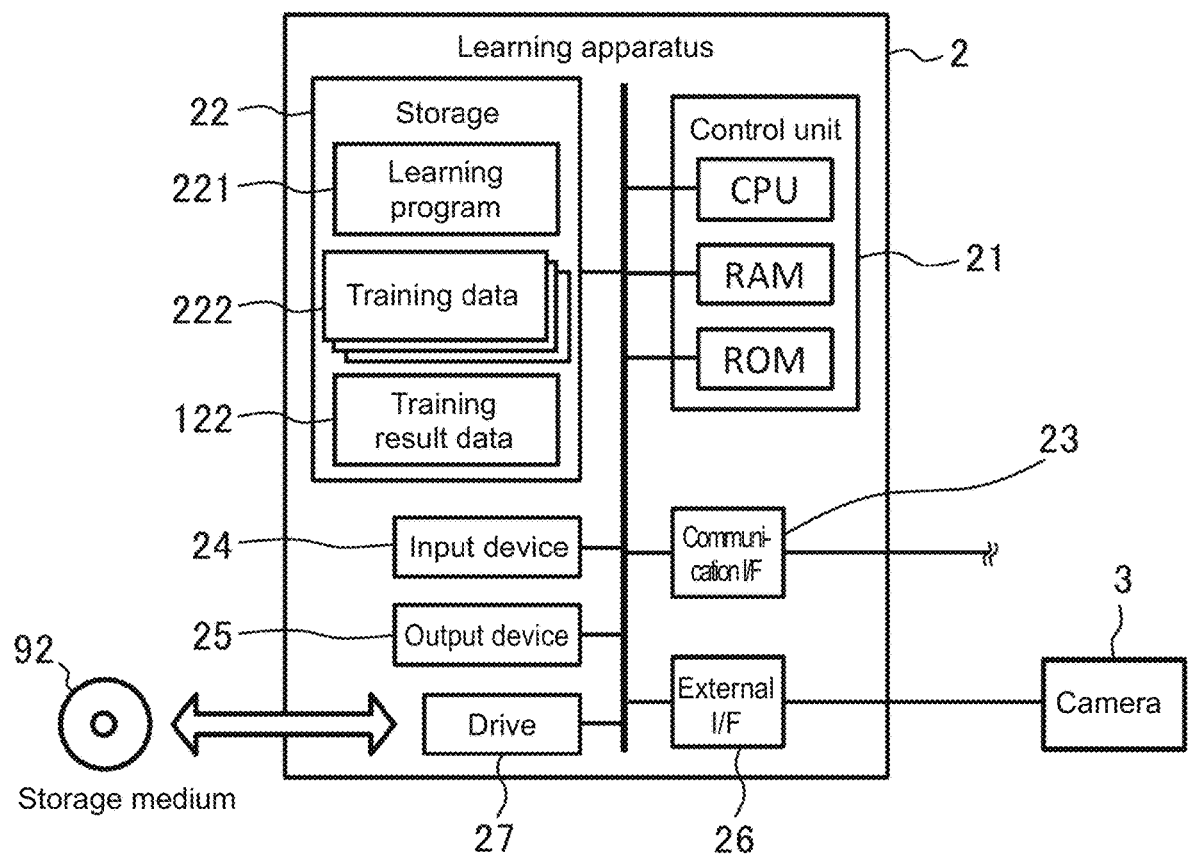
FIG. 3 is a block diagram illustrating a hardware configuration of a learning apparatus, such as in FIG. 1.

FIG. 3 is a block diagram of the learning apparatus according to one or more embodiments. As shown in FIG. 3, the learning apparatus 2 according to one or more embodiments is used to train the learners included in the second detector 114. The learning apparatus 2 is a computer including a control unit 21, a storage 22, a communication interface 23, an input device 24, an output device 25, an external interface 26, and a drive 27 that are electrically connected to one another. In FIG. 2, the communication interface and the external interface are abbreviated as a communication I/F and an external I/F as in FIG. 1.

The components from the control unit 21 to the drive 27 and a storage medium 92 are the same as the components from the control unit 11 to the drive 17 and the storage medium 91 included in the image processing apparatus 1. However, the storage 22 in the learning apparatus 2 stores, for example, a learning program 221 to be executed by the control unit 21, training data 222 used to train learners, and the training result data 122 generated by executing the learning program 221.

The learning program 221 is executed by the learning apparatus 2 to implement learning processing (FIG. 8) of a neural network (described later). The training data 222 is used to train learners to detect the orientation of a human face or the positions of facial components. This will be described in detail later.

The learning program 221 and/or the training data 222 may be stored in the storage medium 92 as in the image processing apparatus 1. Thus, the learning apparatus 2 may obtain, from the storage medium 92, the learning program 221 and/or the training data 222 to be used.

For the specific hardware configuration of the learning apparatus 2, components may be eliminated, substituted, or added as appropriate depending on an embodiment as in the image processing apparatus 1. The learning apparatus 2 may also be an information processing apparatus dedicated to an intended service, or may be a general-purpose server or a desk top PC.

2. Functional Components of Image Processing Apparatus

The functional components of the image processing apparatus 1 according to one or more embodiments will now be described with reference to FIG. 4. FIG. 4 is a schematic diagram of the image processing apparatus 1 according to one or more embodiments showing its functional components.

2-1. Overview of Components

As shown in FIG. 4, the control unit 11 in the image processing apparatus 1 loads the image processing program 121 stored in the storage 12 into the RAM. The CPU in the control unit 11 then interprets and executes the image processing program 121 loaded in the RAM to control each unit. As shown in FIG. 4, the image processing apparatus 1 according to one or more embodiments thus functions as a computer including an image obtaining unit 111, a cover determination unit 112, the first detector 113, and the second detector 114.

The image obtaining unit 111 obtains a captured image generated by the camera 3. The cover determination unit 112 determines whether a face in the captured image is covered by a cover, such as a mask or sunglasses. When the cover determination unit 112 determines that the face is not covered, the first detector 113 detects the orientation of the face or the positions of facial components based on the captured image. When the cover determination unit 112 determines that the face is covered, the second detector 114 detects the orientation of the face or the positions of facial components based on the captured image. In one or more embodiments, for example, the cover determination unit 112 determines whether the face is covered by a mask as a cover, and the first and second detectors 113 and 114 detect the orientation and the angle of the face, and the positions of the eyes as facial components. These functional components will now be described in detail.

2-2. Cover Determination Unit

Figure 5A:
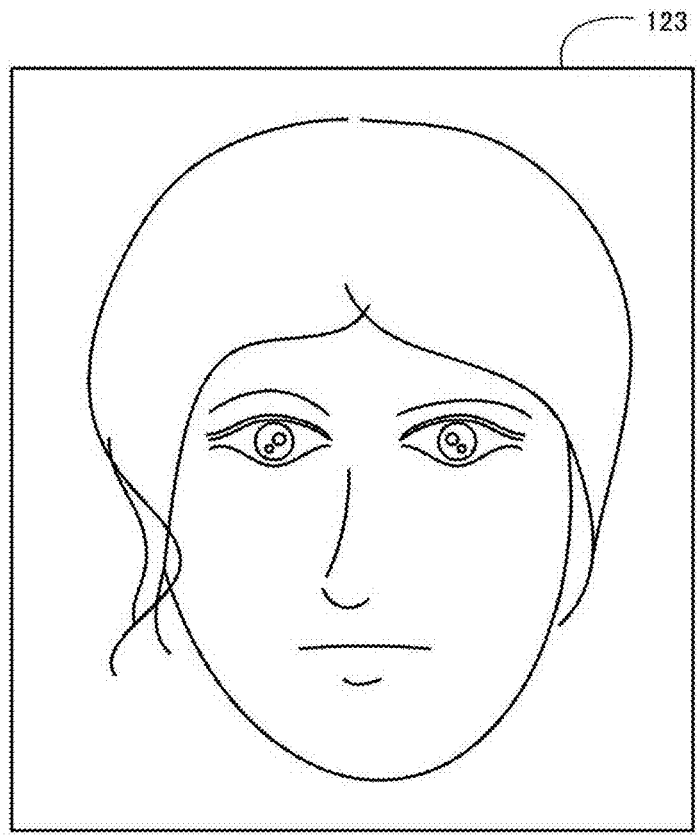
FIG. 5A is a diagram illustrating a captured image including a person wearing no cover.
Figure 5B:
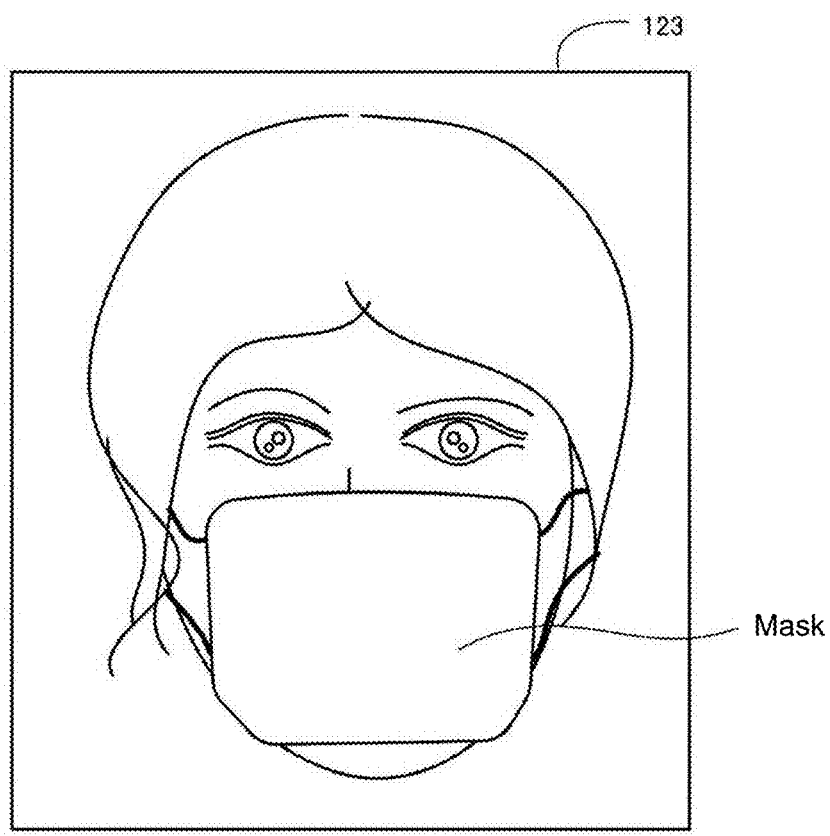
FIG. 5B is a diagram illustrating a captured image including a person wearing a cover.

The cover determination unit 112 will be described with reference to FIGS. 5A and 5B. For example, the cover determination unit 112 determines whether a person in a captured image 123 wears no cover as shown in FIG. 5A or wears a cover such as a mask as shown in FIG. 5B. The method for the determination is not limited, and may be selected from various methods including pattern matching.

2-3. First Detector

Various techniques have been developed to detect the orientation of a face without a cover or the positions of facial components without a cover. Thus, the first detector may use any processing. For example, the first detector may extract feature points using three-dimensional models, or specifically, techniques described in WO 2006/051607 and Japanese Unexamined Patent Application Publication No. 2007-249280. With such techniques, the first detector detects the orientation and the angle of a face, and the positions of eyes based on the captured image 123.

2-4. Overview of Second Detector

The second detector 114 will now be described with reference to FIG. 4. As shown in FIG. 4, the second detector 114 uses the captured image 123 as an input into learners trained for face orientations and facial component positions. The learners then perform arithmetic operations to obtain output values. The second detector 114 obtains information about the orientation and the facial component positions of the human face in the captured image 123 based on the output values obtained from the learners.

2-4-1. Overview of Learners

Figure 6:
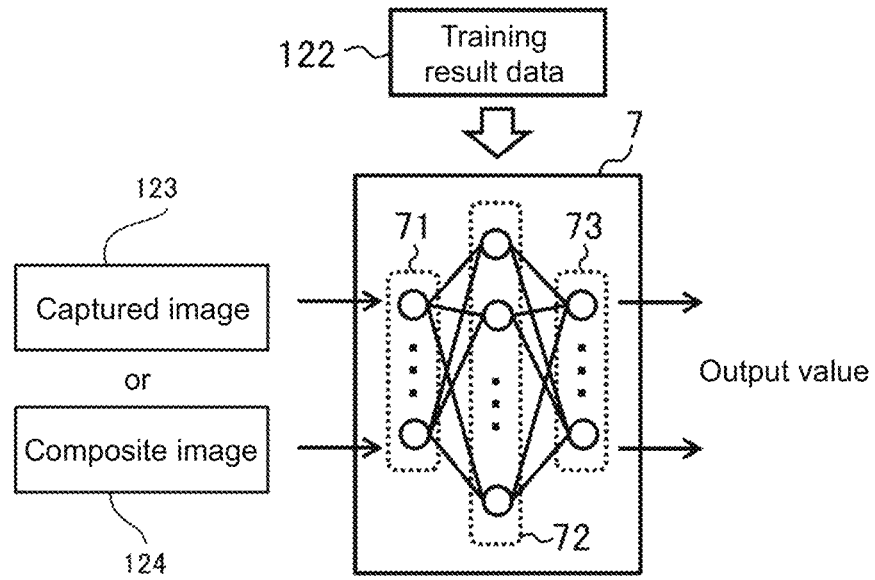
FIG. 6 is a diagram illustrating a neural network used by an image processing apparatus, such as in FIG. 1.

The learners will now be described with reference to FIGS. 4 and 6. As shown in FIG. 4, the image processing apparatus 1 according to one or more embodiments detects a face orientation using, for example, four learners, or specifically, a first orientation learner 710 and three different second orientation learners 720. The image processing apparatus 1 detects facial components using six learners, or specifically, three different first component learners 730 and three different second component learners 740. Thus, the ten learners 710 to 743 in total are used in one or more embodiments. The learners 710 to 743 are all constructed using a neural network. More specifically, each learner is constructed using a multilayer neural network used for deep learning as shown in FIG. 6. Each learner includes an input layer 71, a middle layer (hidden layer) 72, and an output layer 73 in the stated order from the input end.

The neural network 7 in FIG. 6 includes the single middle layer 72. In this structure, an output from the input layer 71 is input into the middle layer 72, and an output from the middle layer 72 is input into the output layer 73. However, the neural network 7 may not include the single middle layer 72, and may include two or more middle layers 72.

The layers 71 to 73 each include one or more neurons. For example, the number of neurons included in the input layer 71 may be set in accordance with the number of pixels of each captured image 123. The number of neurons included in the middle layer 72 may be set as appropriate depending on an embodiment. The output layer 73 may be set in accordance with the orientation, the angle, and the feature point coordinates of a face, which are described later.

Neurons in neighboring layers are connected to each other as appropriate. Each connection has a preset weight (connection weight). Although each neuron is connected to all neurons in a neighboring layer in FIG. 6, the connection of neurons is not limited to the above example, but may be determined as appropriate depending on an embodiment.

Each neuron has a preset threshold. An output of each neuron is determined basically depending on whether the sum of the product of each input and the corresponding weight exceeds the threshold. The image processing apparatus 1 identifies the orientation, the angle, and the feature point coordinates of a face based on output values obtained from the output layer 73 by inputting each captured image into the input layer 71 of the neural network 7.

Information representing the configuration of the neural network 7 (e.g., the number of layers of the neural network 7, the number of neurons in each layer, the connections between neurons, and the transfer function of each neuron), the connection weights between neurons, and a threshold for each neuron is included in the training result data 122. The image processing apparatus 1 refers to the training result data 122, and sets the trained learners 710 to 740 to be used for the processing associated with detection of the orientation of a face and the positions of facial components.

2-4-2. Learner for Detecting Face Orientation

The learners used for detecting a face orientation will be described with reference to FIG. 4. As described above, the four learners are used for detecting a face orientation in one or more embodiments. More specifically, the first orientation learner 710 is used to roughly detect the orientation of a face in a captured image, and the three different second orientation learners 720 (721 to 723) are used to detect a specific angle of the face orientation. The first orientation learner 710 corresponds to a first learner of one or more embodiments, and the second orientation learners 721 to 723 correspond to a third learner of one or more embodiments.

Figure 7:
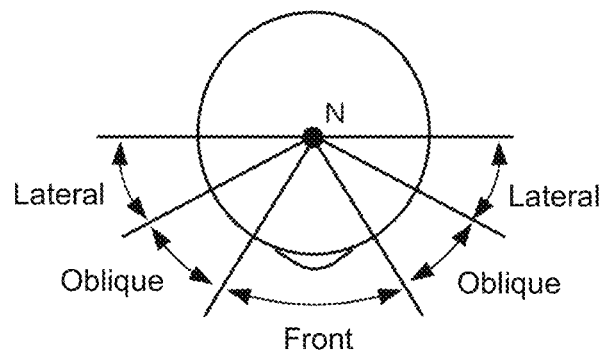
FIG. 7 is a plan view illustrating orientations of a face.

As shown in FIG. 4, upon receiving an input captured image 123, the first orientation learner 710 obtains information about a rough face orientation indicating one of three states selected from whether the face is facing the front, the face is oriented obliquely, or the face is oriented laterally, and outputs the information. As shown in FIG. 7, for example, facing the front corresponds to the angular range of 0 to 30 degrees to the right and to the left about an axis N, which vertically extends through the center of a person's head. Similarly, being oriented obliquely corresponds to the angular range including right and left angular ranges extending 30 to 60 degrees about the vertical axis N, and being oriented laterally corresponds to the angular range including the right and left angular ranges extending from 60 to 90 degrees about the vertical axis N. This output is hereafter referred to as orientation information (first information).

The second orientation learner 720 receives an input captured image, and outputs the specific orientation of the face, or specifically the angle of the face. However, in one or more embodiments, the three different second orientation learners 721 to 723 are used. More specifically, the three learners are a front orientation learner 721 trained using a captured image including a face facing the front, an oblique orientation learner 722 trained using a captured image including a face oriented obliquely, and a lateral orientation learner 723 trained using a captured image including a face oriented laterally.

The front orientation learner 721 receives an input of the captured image 123 including a face determined to be facing the front by the first orientation learner 710, and outputs a specific angle. Similarly, the oblique orientation learner 722 receives an input of the captured image 123 including a face determined to be in an oblique orientation by the first orientation learner 710, and the lateral orientation learner 723 receives an input of the captured image 123 including a face determined to be in a lateral orientation by the first orientation learner 710. The output angle is hereafter referred to as angle information (third information).

2-4-3. Learners for Detecting Positions of Facial Components

The learners used for detecting the positions of facial components will now be described with reference to FIG. 4. As described above, the six learners are used for detecting the positions of facial components in one or more embodiments. More specifically, the three different first component learners 730 are used to detect the positions of facial components in a captured image, and the three different second component learners 740 (741 to 743) are used to detect the accurate positions of the facial components. The first component learners 730 correspond to a second learner in one or more embodiments, and the second component learners 740 correspond to a fourth learner in one or more embodiments.

As shown in FIG. 4, the three different first component learners 730 are prepared in the same manner as the second orientation learners 721 to 723. More specifically, the three different first component learners 730 include a first front component learner 731 trained using a captured image including a face facing the front, a first oblique component learner 732 trained using a captured image including a face oriented obliquely, and a first lateral component learner 733 trained using a captured image including a face oriented laterally.

Figure 8:
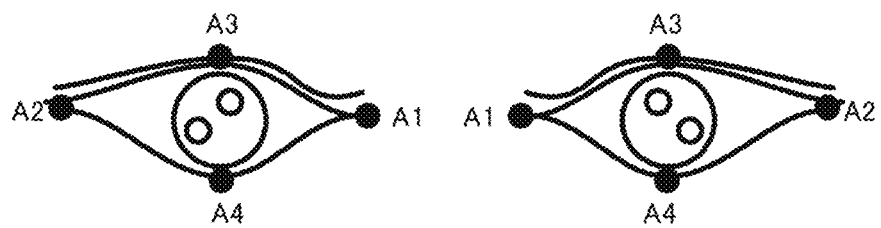
FIG. 8 is a diagram illustrating feature points of eyes.

The first front component learner 731 receives an input of the captured image 123 including a face determined to be facing the front by the first orientation learner 710, and outputs the positions of facial components based on the captured image 123. Similarly, the first oblique component learner 732 receives an input of the captured image 123 including a face determined to be oriented obliquely by the first orientation learner 710, and the first lateral component learner 733 receives an input of the captured image 123 including a face determined to be oriented laterally by the first orientation learner 710. In one or more embodiments, for example, the learners 731 to 733 are each set to output the positions of four feature points of each eye not covered by a mask. More specifically, as shown in FIG. 8, four feature point positions, or an inner corner A1, an outer corner A2, a top edge A3, and a bottom edge A4 of each of the right and left eyes are output. In other words, the coordinates of the four feature points in the captured image 123 are obtained. This output is referred to as first feature point information (second information).

The second component learner 740 will now be described with reference to FIG. 4. As shown in FIG. 4, the three different learners are prepared. More specifically, the three different learners include a second front component learner 741 trained using a captured image including a face facing the front, a second oblique component learner 742 trained using a captured image including a face oriented obliquely, and a second lateral component learner 743 trained using a captured image including a face oriented laterally.

Figure 9:
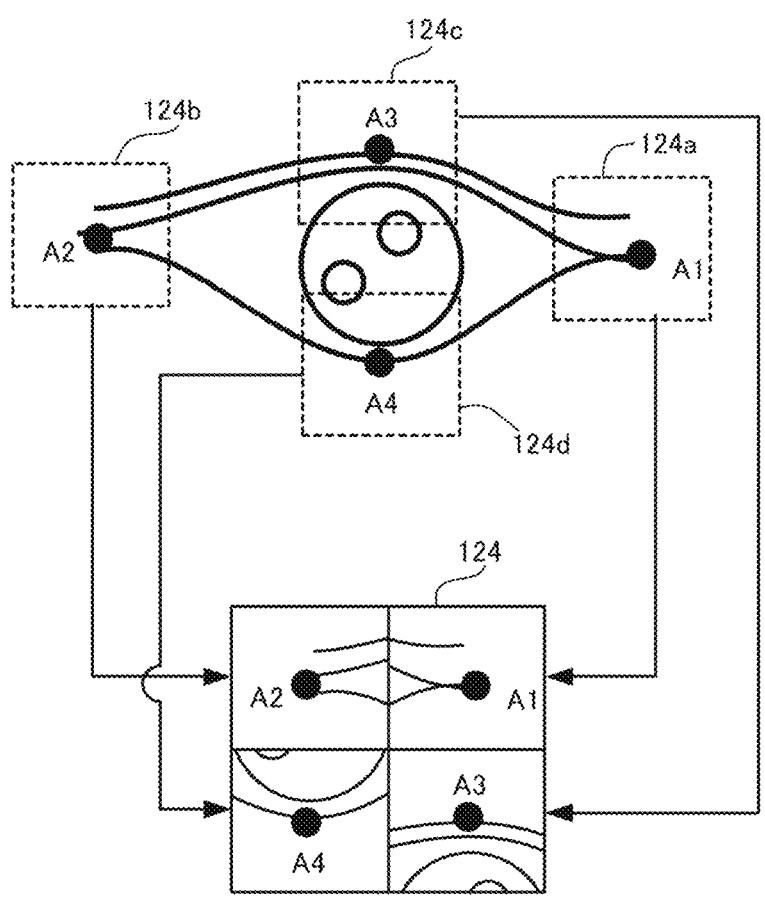
FIG. 9 is a diagram illustrating a method for generating a composite image based on feature points of a detected eye.

An input for each of the learners 741 to 743 is set as described below. Partial images each including a different feature point output from the first component learner 730 are cut from a captured image. The images are then arranged into a composite image, which is then received as an input. As shown in FIG. 9, for example, square partial images 124a to 124d each including one of the feature points A1 to A4 at the center are extracted from the input captured image 123 when the first component learner outputs the positions of the four feature points A1 to A4 associated with an eye. Then, the four partial images 124a to 124d are arranged into a composite image 124. Although the partial images 124a to 124d may be formed with any method, these partial images may be images each with a predetermined size to include a feature point substantially at the center to enable learning using at least these images. Such a composite image 124 is generated for each of the right and left eyes. The second component learners 741 to 743 are prepared for each of the right and left eyes, and each receive an input of the corresponding composite images 124 and output the positions of the four feature points A1 to A4. In other words, the coordinates of the four feature points A1 to A4 in a captured image are obtained. This output is referred to as second feature point information (fourth information). The second feature point information may indicate, in place of indicating the coordinates of feature points, a deviation of the coordinates indicated by the first feature point information from the coordinates obtained by the second component learner 740. Although the separate learners are prepared for the right and left eyes, the learners for the right and left eyes may be inverted as described later.

3. Functional Components of Learning Apparatus

Figure 10:
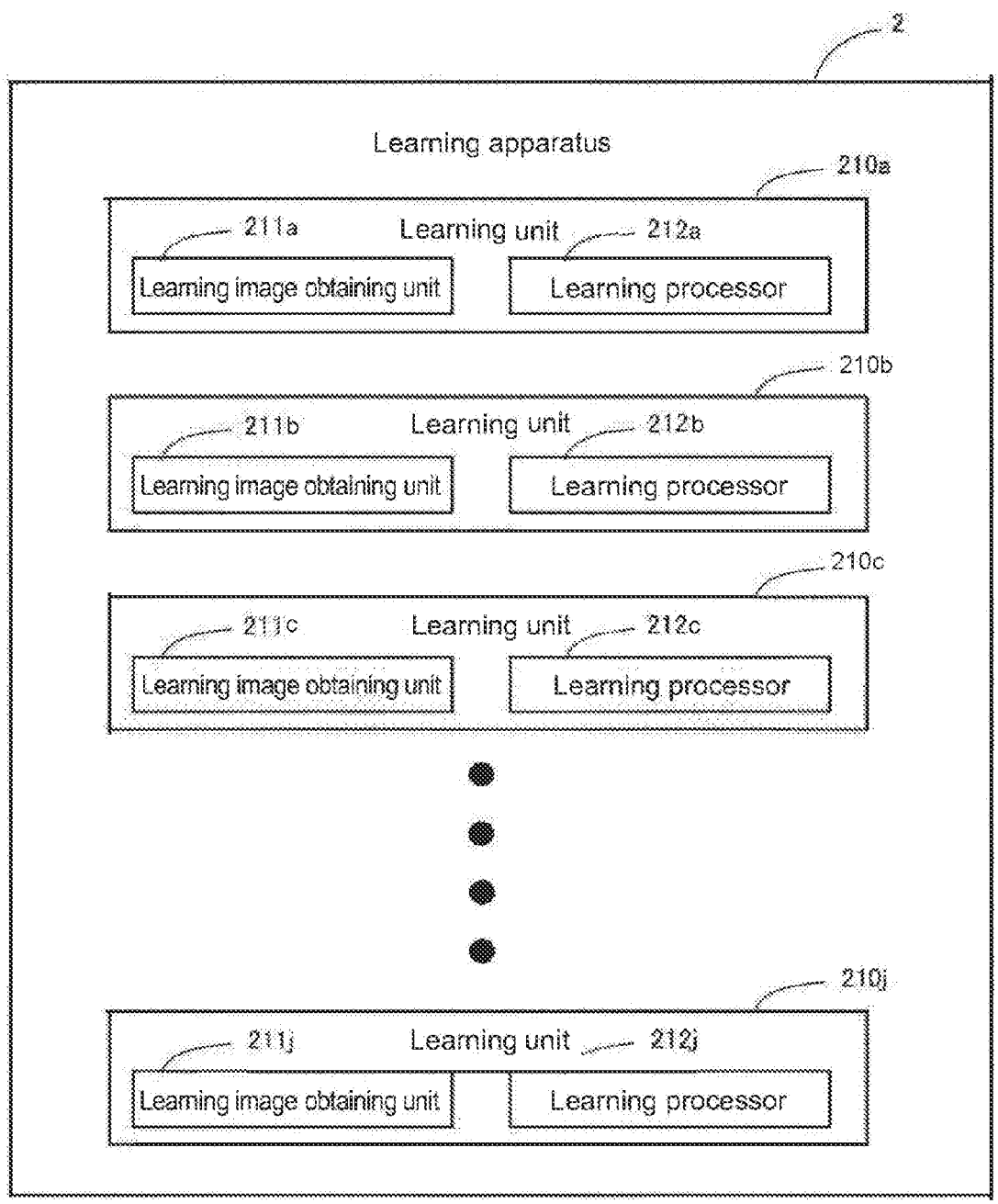
FIG. 10 is a functional block diagram illustrating a learning apparatus, such as in FIG. 1.

The functional components of the learning apparatus 2 according to one or more embodiments will now be described below with reference to FIG. 10. FIG. 10 is a schematic block diagram of the learning apparatus 2 according to one or more embodiments showing its functional components.

The control unit 21 in the learning apparatus 2 loads the learning program 221 stored in the storage 22 into the RAM. The CPU in the control unit 21 then interprets and executes the learning program 221 loaded in the RAM to control each unit. As shown in FIG. 10, the learning apparatus 2 according to one or more embodiments thus functions as a computer including ten learning units 210a to 210j for the ten learners described above, and the learning units 210a to 210j include learning image obtaining units 211a to 211j and learning processors 211a to 212j.

Figure 11:
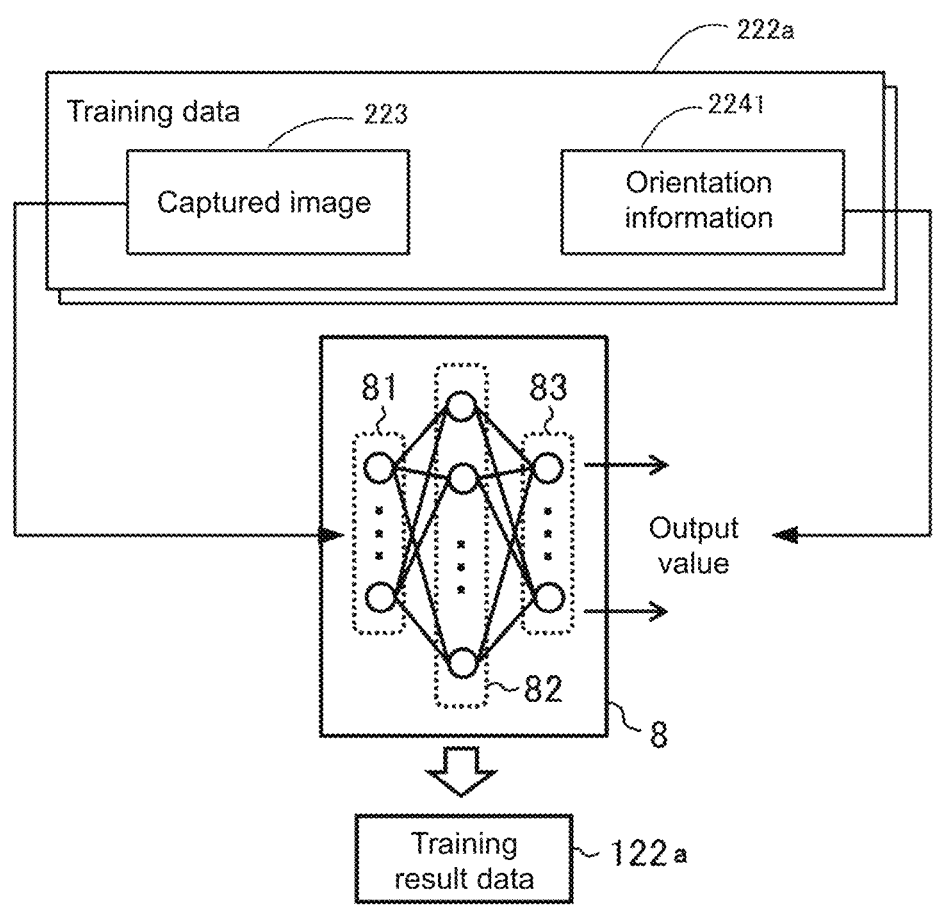
FIG. 11 is a diagram showing training data for a first orientation learner in a learning apparatus, such as in FIG. 1.
Figure 12:
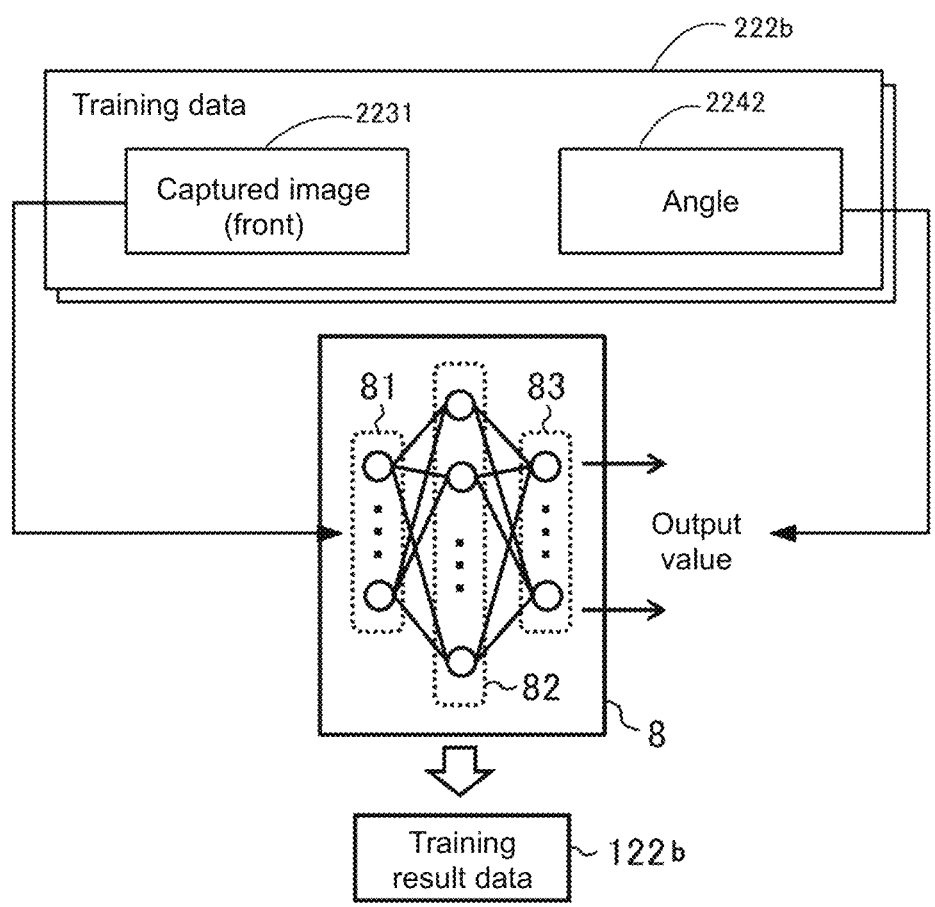
FIG. 12 is a diagram illustrating training data for a front orientation learner in a learning apparatus, such as in FIG. 1.

Training data for the first orientation learner 710 and the second orientation learner 720 will now be described with reference to FIGS. 11 and 12. As shown in FIG. 11, for example, the learning unit 210a for the first orientation learner 710 includes the learning image obtaining unit 211a, which obtains a captured image 223 captured by the camera 3 and orientation information 2241 indicating three orientations (front, oblique, and lateral) of a face in the captured image as a set of training data 222a.

For the second orientation learner 720, three types of training data are used. As shown in FIG. 12, for example, the learning unit 210b for the front orientation learner 721 includes the learning image obtaining unit 211b, which obtains, from captured images captured by the camera 3, a captured image 2231 of a face determined to be facing the front and angle information 2242 indicating the angle of the face facing the front in the captured image 2231 as a set of training data 222b. Similarly, the learning units 210c and 210d for the oblique orientation learner 722 and the lateral orientation learner 723 obtain training data 222c and training data 222d including a captured image of a face oriented obliquely and a captured image of a face oriented laterally. The lateral orientations are symmetrical. For example, a captured image including a rightward oblique orientation is to be inverted and used as an image including a leftward oblique orientation. This reduces the load on the memory. The same applies to each learning unit described below.

Figure 13:
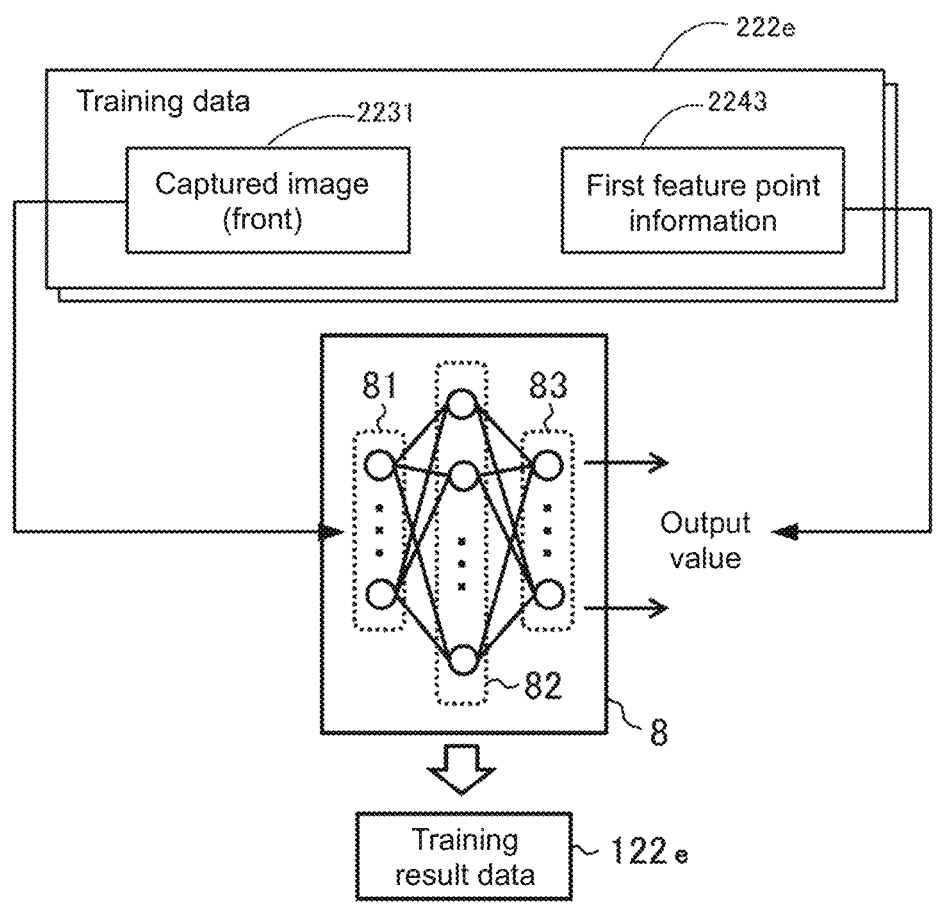
FIG. 13 is a diagram illustrating training data for a first front component learner in a learning apparatus shown in FIG. 1.
Figure 14:
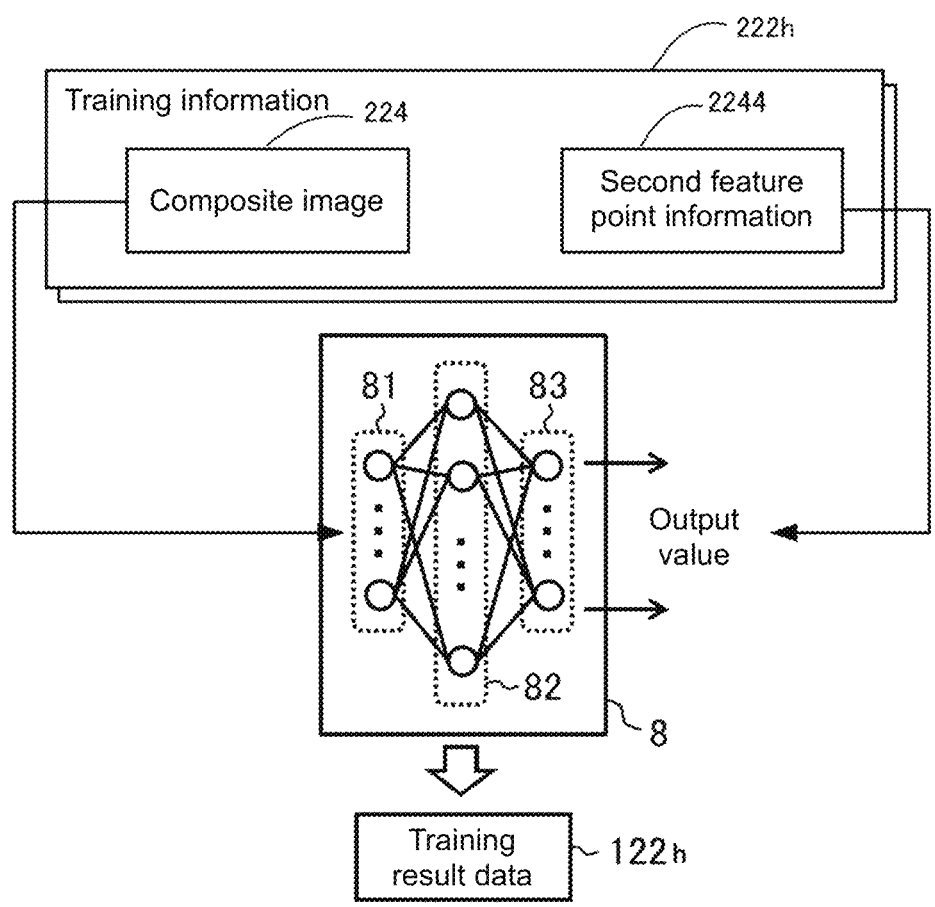
FIG. 14 is a diagram illustrating training data for a second front component learner in a learning apparatus shown in FIG. 1.

Training data for the first component learner 730 and the second component learner 740 will now be described with reference to FIGS. 13 and 14. The first component learner 730 uses three types of training data. As shown in FIG. 13, for example, the learning unit 210e for the first front component learner 731 includes the learning image obtaining unit 211e, which obtains, from captured images captured by the camera 3, a captured image 2231 of a face determined to be facing the front and the first feature point information 2243 indicating the feature point positions of the eyes of the face in the captured image 2231 as a set of training data 222e. Similarly, the learning units 210f and 210g for the first oblique component learner 732 and the first lateral component learner 733 obtain training data 222f and training data 222g including a captured image of a face oriented obliquely and a captured image of a face oriented laterally.

Also, the second component learner 740 uses three types of training data. As shown in FIG. 14, for example, the learning unit 210h for the second front component learner 741 includes the learning image obtaining unit 211h, which obtains a composite image of a face facing the front and the second feature point information 2244 indicating the feature point positions of the eyes of the face in the composite image as a set of training data 222h. Similarly, the learning units 210i and 210j for the second oblique component learner 742 and the second lateral component learner 743 obtain training data 222i and training data 222j including a captured image of a face oriented obliquely and a captured image of a face oriented laterally. Although the learners may be prepared for both the right and left eyes, an image of one eye may be used and then inverted for the other eye, because the right and left eyes are laterally symmetrical.

The captured images 223 or composite images 224 obtained using the training data sets 222a to 222j are input into the corresponding learning processors 212a to 212j. The learning processors then cause a neural network 8 to be learned to output values corresponding to the orientation information, the angle information, the first feature point information, and the second feature point information.

As shown in FIG. 11 to FIG. 14, the neural network 8, which is a learner, includes an input layer 81, a middle layer (hidden layer) 82, and an output layer 83 in the same manner as the neural network 7. The layers 81 to 83 are the same as the layers 71 to 73. The captured images 223 or the composite images 224 are input into the learning processors 212a to 212j through the learning processing of the neural network. The learning processors then construct the neural network 8 that outputs output values corresponding to the above sets of information. The learning processor 212 then stores information representing the configuration of the constructed neural network 8, the connection weights between neurons, and the threshold of each neuron in the storage 22 as pieces of training result data 122a to 122j. The pieces of training result data 122a to 122j are then transmitted to the image processing apparatus 1 with any of the various methods described above. The training result data 122 may be updated regularly. The generated training result data 122 may be transmitted to the image processing apparatus 1 by the control unit 21 at every execution of learning processing to regularly update the training result data 122 retained by the image processing apparatus 1.

4. Others

The functions of the image processing apparatus 1 and the learning apparatus 2 will be described in detail later in operation examples. The image processing apparatus 1 and the learning apparatus 2 according to one or more embodiments each implement their functions with a general-purpose CPU. In one or more embodiments, some or all of the functions may be implemented by one or more dedicated processors. For the functional components of the image processing apparatus 1 or the learning apparatus 2, components may be eliminated, substituted, or added as appropriate depending on an embodiment.

5. Operation of Image Processing Apparatus

Figure 15:
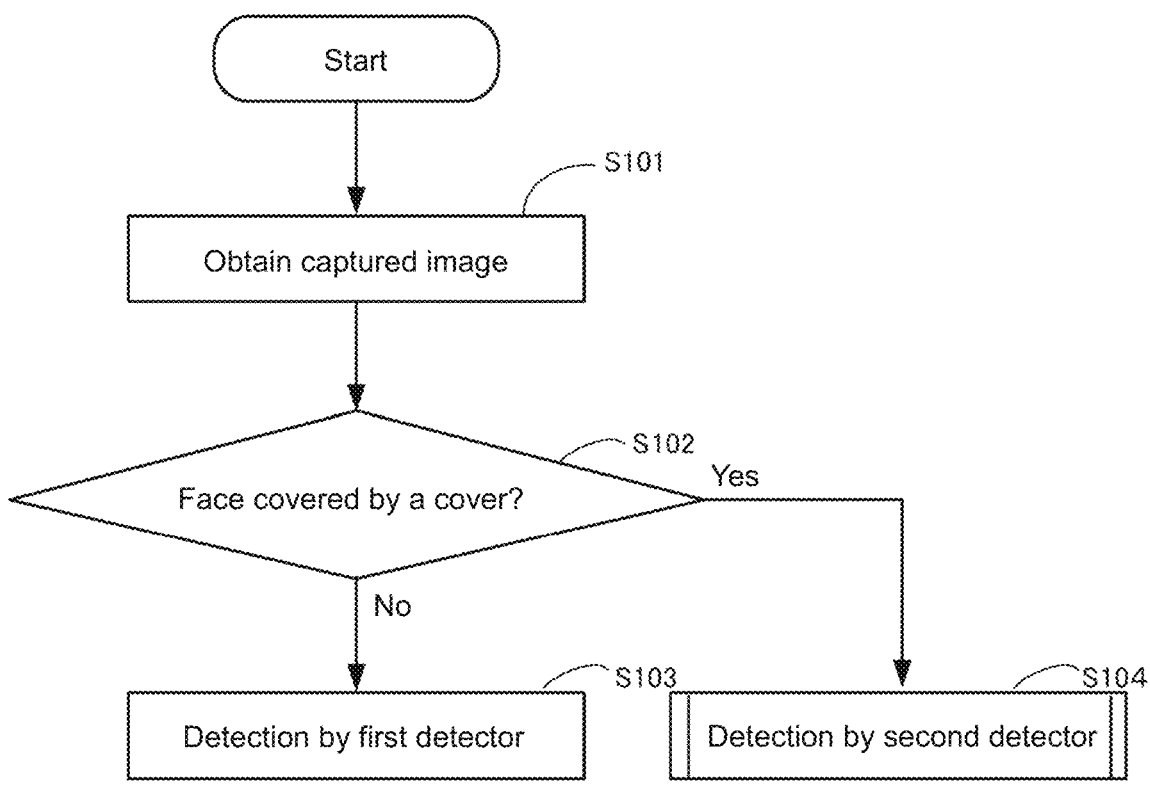
FIG. 15 is a flow diagram illustrating an operation of an image processing apparatus, such as in FIG. 1.

Operation examples of the image processing apparatus 1 will now be described with reference to FIG. 15. FIG. 15 is a flowchart of a procedure performed by the image processing apparatus 1. The procedure described below is a mere example, and each of its processes may be modified in any possible manner. In the procedure described below, steps may be eliminated, substituted, or added as appropriate depending on an embodiment.

A user first activates the image processing apparatus 1 to execute the image processing program 121. The control unit 11 in the image processing apparatus 1 refers to the training result data 122, and defines the configuration of the neural network 7, the connection weights between neurons, and the threshold for each neuron. The control unit 11 then follows the procedure described below, and, detects the orientation of a face or the positions of facial components included in the captured image based on the captured image.

The control unit 11 then functions as the image obtaining unit 111, and obtains the captured image 123 including a human face from the camera 3, which is connected to the control unit 11 through the external interface 16 (step S101). As described above, the captured image 123 may be a still image, or a moving image from which a captured image of each frame is obtained.

Then, the control unit 11 functions as the cover determination unit 112, and determines whether each captured image 123 obtained in step S101 includes a cover (step S102). When determining that the image includes no cover (No in step S102), the control unit 11 uses the first detector 113 to detect the orientation of a face or the positions of facial components included in the captured face based on the captured image 123 (step S103).

When determining that the captured image 123 includes a cover (Yes in step S102), the control unit 11 uses the second detector 114 to detect the captured face orientation or facial component positions based on the captured image 123 (step S104). The processing of the second detector 114 will now be described in more detail with reference to FIG. 16.

Figure 16:
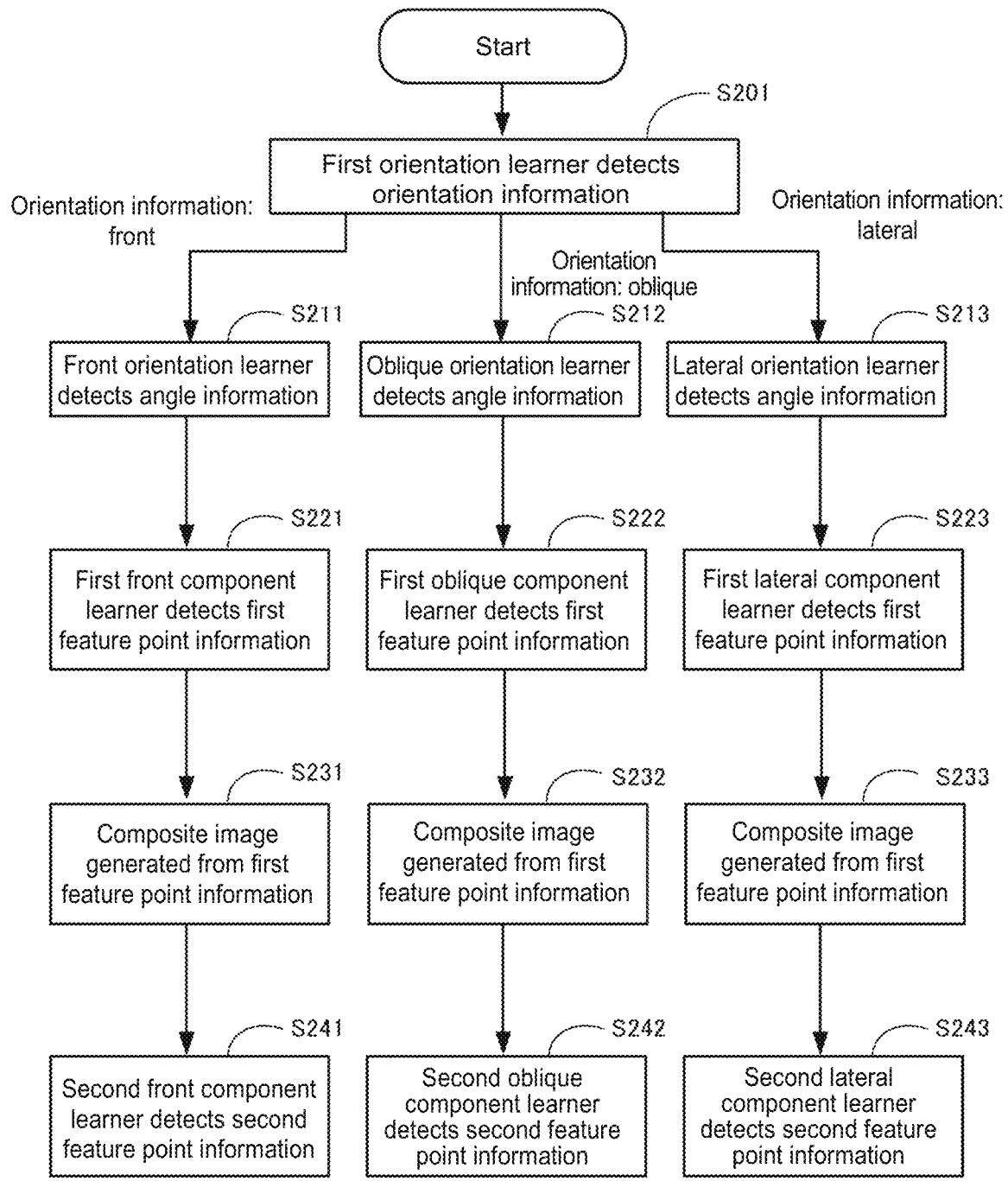
FIG. 16 is a flow diagram illustrating an operation associated with a second detector in an image processing apparatus, such as in FIG. 1.

As shown in FIG. 16, the second detector 114 first uses the first orientation learner 710 to detect the orientation of a face based on the captured image 123 (step S201). More specifically, the first orientation learner 710 receives an input of the captured image 123, and outputs an output value corresponding to any one of the three orientation described above. The control unit 11 stores the orientation obtained as described above in the storage 12 as the orientation information. Subsequently, the control unit 11 selects one of the second orientation learners 721 to 723 that corresponds to the orientation information. For example, when the detected orientation is the front, the front orientation learner 721 is selected to receive an input of the captured image 123 (step S211). As a result, the front orientation learner 721 outputs a value corresponding to the angle of the face in the captured image 123. The control unit 11 then stores the obtained angle in the storage 12 as the angle information. Although the selection of the front orientation learner 721 is based on the orientation information indicating the front in the above example, selection of other orientation learners may be performed in a similar manner when the orientation information indicates an oblique or lateral orientation (steps S212 and S213).

The control unit 11 then selects one of the first component learners 730 that corresponds to the orientation information. For example, when the orientation information indicates the front, the first front component learner 731 is selected to receive an input of the captured image 123 (step S221). As a result, the first front component learner 731 outputs values corresponding to four feature points in the captured image. In other words, the coordinates of the four feature points A1 to A4 in the captured image 123 are obtained, and stored into the storage 12 as the first feature point information. Although the selection of the front component learner 731 is based on the orientation information indicating the front in the above example, selection of other component learners may be performed in a similar manner when the orientation information indicates an oblique or lateral orientation (steps S222 and S223).

Subsequently, the control unit 11 generates a composite image including the four feature points output from the first front component learner 731 (steps S231, S232, and S233). The composite image is generated in the manner as described above. The control unit 11 then inputs the composite image to, for example, the second front component learner 741 corresponding to the front (step S241). As a result, the second front component learner 741 outputs values corresponding to the coordinates of the four feature points in the composite image. When the coordinates obtained as described above deviate from the coordinates indicated by the first feature point information, the first feature point information is corrected and then stored into the storage 12 as the second feature point information. Thus, the orientation and angle of a face, and the feature point coordinates of the eye in a single captured image are obtained. Although the orientation information indicates the front in the above example, the same applies to when the orientation information indicates an oblique or lateral orientation (steps S242 and S243).

6. Characteristics

In one or more embodiments described above, the first component learner 730 detecting the positions of facial components in a captured image corresponds to the orientation information output from the first orientation learner 710. In other words, a facial component is detected with each learner trained with a specific orientation of the face. This structure can detect the position of a facial component with increased accuracy. Thus, the positions of facial components can be detected accurately although the face is covered by a cover and a sufficient number of nodes cannot be obtained and thus the first detector cannot be used.

In one or more embodiments, the second component learner is used to detect the positions of facial components with increased accuracy. The second component learner is trained using partial images including feature points obtained by the first component learner, instead of using an entire captured image. Thus, facial components are detected more locally. This enables detection of the positions of facial components with further increased accuracy.

For face orientation detection, the second orientation learner 720 can also detect the angle of a face. In other words, the face orientation is detected by the learners trained using a specific face orientation to detect the angle of the face.

The image processing apparatus described above can be used in various fields, and can be installed, for example, in an automobile. More specifically, the face of a driver is captured by a camera during driving, and the angle of the face and the positions of the eyes are detected. Thus, the behavior of the driver can be analyzed during driving. For example, this structure enables detection of a face not facing the front during driving or the eyes determined to be closed based on the positions of their feature points, and thus detection of the driver's abnormal behavior including distracted driving or falling asleep. When detecting such an abnormal behavior, the apparatus can output an alert or can stop the automobile urgently.

Also, the apparatus can be used in various fields in which the orientation of a human face or the positions of facial components are detected and used.

7. Modifications

One or more embodiments described above in detail are mere examples of the present invention in all aspects. One or more embodiments may be variously modified or altered without departing from the scope of the present invention. For example, one or more embodiments may be modified in the following forms. The same components as those in one or more embodiments are hereafter given the same numerals, and the operations that are the same as those in one or more embodiments will not be described. The modifications described below may be combined as appropriate.

7.1

For example, as shown in FIGS. 5A to 6, a typical multilayer forward propagation neural network is used for each of the neural networks (7 and 8) in one or more embodiments. However, the type of each neural network (7 or 8) is not limited to the above example, but may be selected as appropriate depending on an embodiment. For example, each neural network (7 or 8) may be a convolutional neural network that uses the input layer 71 and the middle layer 72 as a convolutional layer and a pooling layer. Also, for example, each neural network (7 or 8) may be a recurrent neural network that includes connections recurring from output to input, or for example, from the middle layer 72 to the input layer 71. The number of neural networks (7 or 8), the number of neurons in each layer, the connections between neurons, and the transfer function of each neuron may be determined as appropriate depending on an embodiment.

7.2

The image processing apparatus 1 and the learning apparatus 2 that trains the learners (neural networks) each use separate computers in one or more embodiments. However, the image processing apparatus 1 or the learning apparatus 2 is not limited to the structure as described in the above example, but may be a system functioning as both the image processing apparatus 1 and the learning apparatus 2 implemented by at least one computer. The learning apparatus 2 may be incorporated in the image processing apparatus 1.

7.3

The learners according to one or more embodiments are constructed using neural networks. However, the learners are not limited to neural networks and may be any configurations that can receive an input captured image 123 capture by the camera 3 as appropriate depending on an embodiment. Examples of such learners that can receive multiple captured images 123 include, in addition to neural networks described above, support-vector machines, self-facial organizing maps, and learners trained by reinforcement learning.

7.4

Although the image processing apparatus 1 receives captured images captured by the camera 3 to detect a face orientation or other information in one or more embodiments, the image processing apparatus 1 may receive preliminarily prepared images without using a camera, or may detect a face orientation or other information based on images preliminarily stored in the storage 12 in the image processing apparatus 1.

7.5

Although the four learners 710 to 740 are used to detect a face orientation, a face angle, and the positions of feature points in one or more embodiments, one or more embodiments is not limited to this structure. For example, the second detector 114 may use only the first orientation learner 710 and the first component learner 730 and may detect a face orientation and the positions of feature points. In one or more embodiments, the first orientation learner 710, the first component learner 730, and the second component learner 740 may be used to detect a face orientation and the positions of detailed feature points. In one or more embodiments, the first orientation learner 710 and the second orientation learner 720 may be used to detect a face orientation and a face angle. Although the three different learners are defined for each of the second orientation learner 720, the first component learner 730, and the second component learner 740 in one or more embodiments to detect the respective face orientations (front, oblique, and lateral), one or more embodiments is not limited to this structure. More specifically, two face orientations or four or more face orientations may be defined as appropriate, for which two learners or four or more learners may be prepared.

7.6

The second component learner 740 receives an input of the composite image 124 in one or more embodiments. Partial images 124a to 124d each including the corresponding one of the feature points A1 to A4 are cut from the captured image 123. The images are then arranged into the composite image 124, which is input into the second component learner 740. However, the input into the second component learner 740 is not limited to this image, but may be selected from various images generated for input. For example, the partial images 124a to 124d, in place of the composite image 124, may be input separately. Also, the entire captured image 123 may be input into the second component learner 740, without the partial images being cut from the captured image 123. In other words, various input images each including a feature point detected by the first component learner 730 may be used as input images.

7.7

Although the image processing apparatus 1 according to one or more embodiments uses the first detector 113 or the second detector 114 after determining whether the face is covered, the image processing apparatus 1 may include only the second detector 114.

7.8

Although the cover is a mask and the positions of the eyes as facial components are detected in one or more embodiments, the positions of facial components other than the eyes may be detected. For example, the position of the mouth or nose as a facial component may be detected when the face is covered by sunglasses. Although the face orientation is detected laterally in one or more embodiments, the face orientation may be detected vertically, or both laterally and vertically. Although the three face orientations are to be detected in one or more embodiments, one or more embodiments are not limited to this example and the face orientations to be detected may be defined as appropriate.

APPENDIX 1

An image processing apparatus, comprising:
a memory configured to store a first learner and at least one second learner; and
at least one hardware processor connected to the memory,
wherein the first learner is a first learner trained to detect an orientation of a face in an image including a human face, and is configured to receive an input of a target image including a human face, and output first information associated with an orientation of a face included in the target image,
the second learner is a second learner trained, for the first information, to detect a position of a facial component in an image including a human face, and is configured to receive an input of the target image, and output second information associated with a position of a facial component included in the target image, and
the at least one hardware processor is configured to use the first learner to obtain the first information from the target image, and use the second learner corresponding to the first information to obtain the second information from the target image.

APPENDIX 2

An image processing method, comprising:
preparing a first learner trained to detect an orientation of a face in an image including a human face;
obtaining, with at least one hardware processor, from a target image including a human face, first information associated with an orientation of a face with the first learner;
preparing at least one second learner trained, for the first information, to detect a position of a facial component in an image including a human face; and
outputting, with the at least one hardware processor, second information associated with a position of a facial component obtained from the target image with the second learner corresponding to the first information output from the first learner.

The invention claimed is:
1. An image processing apparatus comprising a processor configured with a program to perform operations comprising:
operation as a first orientation learner configured to:
receive an input of a target image comprising a face;
detect an orientation of the face in the target image, the orientation comprising one of a front orientation, an oblique orientation, and a lateral orientation; and
output first information associated with the detected orientation of the face;
operation as a first component learner comprising operation as one of a first front component learner, a first oblique component learner, and a first lateral component learner, corresponding respectively to the detected one of the front orientation, the oblique orientation, and the lateral orientation, configured to:
receive an input of the target image and the first information;
detect, based on the first information, a position of a facial component in the target image; and
output second information associated with the position of the facial component in the target image; and
operation as a cover determination unit configured to determine whether the target image comprises a cover partially covering the face, wherein
the processor is configured with the program to perform operations such that:
operation as the first orientation learner and operation as the first component learner comprise receiving the input of the target image, detecting the orientation or the position of the facial component in the target image, and outputting the first information and the second information, respectively, in response to the cover determination unit determining that the target image comprises the cover.

2. The image processing apparatus according to claim 1, wherein
the first information comprises a piece of information selected from a plurality of different pieces of orientation information each defining the orientation of the face.

3. The image processing apparatus according to claim 1, wherein
the second information comprises information indicating a position of at least one feature point defined in a facial component of the face.

4. The image processing apparatus according to claim 1, wherein
the processor is configured with the program to perform operations further comprising:
operation as a second orientation learner comprising operation as one of a front orientation learner, an oblique orientation learner, and a lateral orientation learner determined to correspond respectively to the detected one of the front orientation, the oblique orientation, and the lateral orientation configured to:
receive an input of the target image comprising the face;
detect, based on the first information, the orientation of the face in the target image; and
output third information associated with the orientation of the face in the target image.

5. The image processing apparatus according to claim 4, wherein
the third information comprises information indicating an angle of the face.

6. The image processing apparatus according to claim 4, wherein
the processor is configured with the program to perform operations further comprising:
operation as a second component learner comprising operation as one of a second front component learner, a second oblique component learner, and a second lateral component learner, corresponding respectively to the detected one of the front orientation, the oblique orientation, and the lateral orientation, configured to:
receive an input of the target image comprising the facial component associated with the second information;
detect, based on the second information, a position of a second facial component in the image; and
output fourth information associated with the position of the second facial component.

7. The image processing apparatus according to claim 6, wherein
the second information comprises information comprising a position of at least one feature point defined in a facial component of the face in the target image, and
the processor is configured with the program such that operation as the second component learner comprises receiving an input of the image comprising the at least one feature point, and outputting a position of at least one second feature point.

8. The image processing apparatus according to claim 1, wherein
each of: the first orientation learner; the first front component learner; the first oblique component learner; and the first lateral component learner comprises a neural network.

9. The image processing apparatus according to claim 6, wherein
each of: the first orientation learner; the first front component learner, the first oblique component learner; the first lateral component learner; the second orientation learner; the second front component learner; the second oblique component learner; and the second lateral component learner comprises a neural network.

10. An image processing method, comprising:
determining whether a target image comprising a face comprises a cover partially covering the face; and
in response to the target image comprising the cover:
preparing a first orientation learner trained to detect an orientation of the face in the image, the orientation comprising one of a front orientation, an oblique orientation, and a lateral orientation;
outputting, with the first orientation learner, first information associated with the orientation of the face;
preparing a first component learner comprising preparing one of a first front component learner, a first oblique component learner, and a first lateral component learner trained, based on the first information and corresponding respectively to the detected one of the front orientation, the oblique orientation, and the lateral orientation, to detect a position of a facial component in the target image; and
outputting with the first component learner, second information associated with the position of the facial component obtained from the target image.

11. The image processing method according to claim 10, further comprising:
preparing a second orientation learner comprising preparing one of a front orientation learner, an oblique orientation learner, and a lateral orientation learner trained, based on the first information and corresponding respectively to the detected one of the front orientation, the oblique orientation, and the lateral orientation of the face, to detect the orientation of the face; and
outputting third information associated with the orientation of the face.

12. The image processing method according to claim 11, further comprising:
preparing a second component learner comprising preparing one of a second front component learner, a second oblique component learner, and a second lateral component learner trained, based on the first information and corresponding respectively to the detected one of the front orientation, the oblique orientation, and the lateral orientation, to detect a position of a second facial component in the image; and
outputting fourth information associated with the position of the second facial component.

13. The image processing method according to claim 10, wherein
each of: the first orientation learner; the first front component learner; the first oblique component learner; and the first lateral component learner comprises a neural network.

14. The image processing method according to claim 12, wherein
each of: the first orientation learner; the first front component learner; the first oblique component learner; the first lateral component learner; the front orientation learner; the oblique orientation learner; the lateral orientation learner; the second front component learner; the second oblique component learner; and the second lateral component learner comprises a neural network.

15. A non-transitory computer-readable storage medium storing an image processing program, which when read and executed, causes a computer to perform operations comprising:
determining whether a target image comprising a face comprises a cover partially covering the face; and
in response to the target image comprising the cover:
preparing a first orientation learner trained to detect an orientation of the face in the image, the orientation comprising one of a front orientation, an oblique orientation, and a lateral orientation;
outputting, with the first orientation learner, first information associated with the orientation of the face;
preparing a first component learner comprising preparing one of at a first front component learner, a first oblique component learner, and a first lateral component learner trained, based on the first information and corresponding respectively to the detected one of the front orientation, the oblique orientation, and the lateral orientation, to detect a position of a facial component in the target image; and
outputting, with the first component learner, second information associated with the position of the facial component obtained from the target image.

16. The non-transitory computer-readable storage medium storing the image processing program according to claim 15, which when read and executed, causes the computer to perform operations further comprising:
preparing a second orientation learner comprising preparing one of a second front orientation learner an oblique orientation learner, and a lateral orientation learner trained, based on the first information and corresponding respectively to the detected one of the front orientation, the oblique orientation, and the lateral orientation, to detect the orientation of the face; and
outputting third information associated with the orientation of the face.

17. The non-transitory computer-readable storage medium storing the image processing program according to claim 16, which when read and executed, causes the computer to perform operations further comprising:
preparing one of a second front component learner, a second oblique component learner, and a second lateral component learner trained, based on the first information and corresponding respectively to the detected one of the front orientation, the oblique orientation, and the lateral orientation, to detect a position of a second facial component in the image; and
outputting fourth information associated with the position of the second facial component.

18. The non-transitory computer-readable storage medium storing the image processing program according to claim 15, wherein
each of: the first orientation learner; the first front component learner; the first oblique component learner; and the first lateral component learner comprises a neural network.

19. The non-transitory computer-readable storage medium storing the image processing program according to claim 17, wherein
  each of: the first orientation learner; the first component learner; the first oblique component learner; the first lateral component learner; the front orientation learner; the oblique orientation learner; the lateral orientation learner; the second front component learner; the second oblique component learner; and the second lateral component learner comprises a neural network.

* * * * *